G. H. CLARKE.

GRATE-BAR.

No. 7,351. Reissued Oct. 17, 1876.

Sec. thro' xx.

Witnesses.

Alfred Wheelock.

L. W. Tracy.

Inventor.

Geo. H. Clarke,

E. H. Johnson, Atty

N. PETERS, PHOTO-LITHOGRAPHER, WASHINGTON, D. C.

UNITED STATES PATENT OFFICE.

GEORGE H. CLARKE, OF BROOKLYN, NEW YORK.

IMPROVEMENT IN GRATE-BARS.

Specification forming part of Letters Patent No. 142,146, dated August 26, 1873; reissue No. 7,351, dated October 17, 1876; application filed June 29, 1876.

*To all whom it may concern:*

Be it known that I, GEORGE H. CLARKE, of Brooklyn, Kings county, New York, have invented certain Improvements in Furnace Grate-Bars, of which the following is a specification:

My invention relates to grate-bars which are locked together one by another, when placed in the furnace; and it consists in a novel construction and arrangement of the locking devices, whereby the bars are more securely held in place, and more easily manipulated in putting them together or taking them apart, and whereby they are rendered more durable by obviating the unequal expansion and contraction which occurred in bars prior to my invention.

Figure 1:
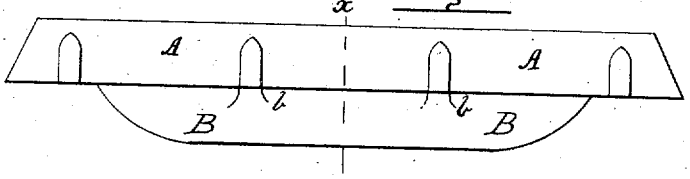
Figure 2:
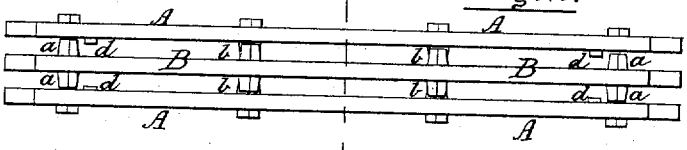
Figure 3:
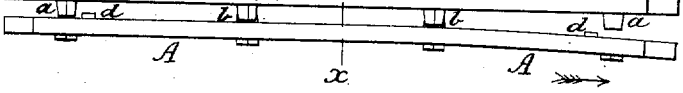
Figure 3:
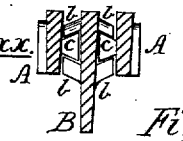
Figure 4:
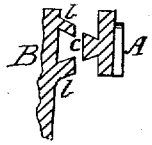

In the accompanying drawings, Figure 1 is a side elevation of my improved grate-bars. Fig. 2 is a plan view of the same. Fig. 3 is a similar view, showing in what manner the bars are put together or taken apart; and Fig. 4 is a section cut through the line *x x*, showing the construction of the transverse locking-lugs.

In the drawing there are only three bars shown; but it is obvious that the group may comprise as many bars as required. Each alternate bar B has on both sides of it pairs of projections *b b*, which incline toward one another at their outer ends, thus leaving a dovetail opening between them. Into these dovetail openings dovetail projections *c c*, on either side of the intervening bars A fit, thus holding the bars together as regards lateral motion.

It will thus be seen that each bar has similar projections or lugs on both sides, and immediately opposite each other, thus equalizing perfectly the amount of metal in all parts of the bar.

To prevent the bars moving in the direction of their length, the bars B B are provided with the projections *a a* at or near their ends on either side, and the bars A A have the projections or lugs *d d*, which are just inside the lugs or projections *a a* when the bars are locked together, as shown at Fig. 2.

To separate the bars one end of the outer bar has to be sprung out, as shown at Fig. 3, until the lug *d* will pass the lug *a*, when the dovetail projections *c c* are moved out of the projections *b b* by moving the bar in the direction as indicated by the arrow.

It will be understood that the reverse of these movements is necessary to put the bars together.

I claim—

1. A series of furnace grate-bars in which each alternate bar has similar lugs on either side, which enter between projections on either side of the intervening bars, substantially as described and specified.

2. In combination with the bars B, provided with the lugs *a a*, the bars A, provided with the dovetail projections *c c* and lugs *d d*, constructed and operating substantially as described and specified.

GEO. H. CLARKE.

Witnesses:

CHAS. EDGAR MILLS,

WILLIAM H. CLARKSON.